United States Patent
Engebretsen et al.

(10) Patent No.: US 12,258,874 B2
(45) Date of Patent: Mar. 25, 2025

(54) ANTI-ICE SYSTEM FOR GAS TURBINE ENGINE AND INLET GUIDE VANE

(71) Applicant: Rolls-Royce North American Technologies Inc., Indianapolis, IN (US)

(72) Inventors: Eric Engebretsen, Indianapolis, IN (US); Aaron Weishaar, Indianapolis, IN (US); Jonathan Acker, Indianapolis, IN (US); Brett Hartnagel, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/347,722

(22) Filed: Jul. 6, 2023

(65) Prior Publication Data
US 2025/0012202 A1    Jan. 9, 2025

(51) Int. Cl.
*F01D 25/02* (2006.01)
*F01D 5/18* (2006.01)
*F02C 7/047* (2006.01)

(52) U.S. Cl.
CPC ............ *F01D 25/02* (2013.01); *F01D 5/18* (2013.01); *F02C 7/047* (2013.01); *F05D 2220/323* (2013.01); *F05D 2240/12* (2013.01); *F05D 2260/2214* (2013.01); *F05D 2260/605* (2013.01)

(58) Field of Classification Search
CPC ... F01D 25/02; F01D 5/18; F01D 9/06; F02C 7/047; B64D 15/04; B64D 2033/0233; F05D 2240/12; F05D 2260/605
See application file for complete search history.

(56) References Cited

U.S. PATENT DOCUMENTS

| | | | |
|---|---|---|---|
| 3,123,283 A * | 3/1964 | Leis | F04D 29/584 |
| | | | 415/115 |
| 5,029,440 A * | 7/1991 | Graber | F02C 7/047 |
| | | | 244/134 B |
| 5,980,202 A * | 11/1999 | Tomita | F01D 11/02 |
| | | | 415/114 |
| 2012/0240594 A1 | 9/2012 | Shamara | |
| 2014/0116044 A1* | 5/2014 | Sarria | F03G 7/04 |
| | | | 60/641.2 |
| 2014/0212278 A1 | 7/2014 | Cowgill | |
| 2015/0033698 A1 | 2/2015 | Cuevas et al. | |
| 2016/0061056 A1 | 3/2016 | Appukuttan et al. | |
| 2017/0175628 A1* | 6/2017 | Subramanian | F01D 25/02 |
| 2021/0270148 A1* | 9/2021 | Marchaj | F02C 7/047 |
| 2023/0184165 A1* | 6/2023 | Hicks | F01D 25/02 |
| | | | 60/39.093 |

* cited by examiner

Primary Examiner — Andrew H Nguyen
(74) Attorney, Agent, or Firm — Barnes & Thornburg LLP

(57) ABSTRACT

A gas turbine engine includes: an inlet guide vane; an inlet channel extending from a location downstream of the inlet guide vane to a stem manifold; and an outlet channel extending to an outlet port, the outlet port configured to dump anti-ice air overboard, wherein the inlet guide vane includes an anti-ice cavity in fluid communication with the inlet channel and the outlet channel such that anti-ice air, flowing from a downstream location within a core flow of the gas turbine, flows from the inlet channel, through the inlet guide vane, and to the outlet channel.

19 Claims, 8 Drawing Sheets

ANTI-ICE SYSTEM FOR GAS TURBINE ENGINE AND INLET GUIDE VANE

TECHNICAL FIELD

This disclosure relates to a gas turbine engine, and particularly for an anti-ice system for a gas turbine engine with inlet guide vanes that are resistant to ice buildup.

BACKGROUND

Gas turbine engines are used on vehicles such as airplane and helicopters. These engines are internal combustion engines that operate to produce thrust by discharging a high velocity exhaust. Some gas turbine engines can also include fan blades to create thrust.

Gas turbine engines include one or more compressors, a combustor and one or more turbines. Air is compressed in the compressor(s), mixed with fuel in the combustor and ignited, such that exhaust gases are created and discharged through a turbine to create thrust. The exhaust gas rotates the turbine, which is typically used to turn a shaft and produce shaft work output, such as to drive the compressor or a gearbox. There can be one or more turbines and corresponding shafts producing shaft work output. Systems within a gas turbine engine can use the shaft work output.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Compressors of a gas turbine engine include several airfoil types. An airfoil refers to a stationary or moving blade-like component that is used to control the flow of fluid or gas within the compressor, and they play a crucial role in directing the fluid or gas flow. There are two primary types of airfoils used in compressors: vanes, which remain stationary, and rotor blades, which spin.

Inlet guide vanes (IGVs) are typically located at the compressor inlet and are used to control the flow of fluid or gas as it enters the compressor. They may have an adjustable angle such that the inlet flow can be regulated, which helps in achieving optimal compressor performance.

In some operational conditions (e.g., certain atmospheric moisture and temperature conditions of engine intake air), non-heated inlet guide vanes may experience ice buildup. The accumulation of ice is problematic, as can cause compressor performance and/or operability loss or may be shed in large pieces that cause damage to downstream blades or vanes or other compressor hardware. To address this issue, inlet guide vanes may be heated. For example, the inlet guide vanes may be hollow and/or have fluid pathways for receiving hot air, where the associated heat prevents ice formation.

In modern inlet guide vanes, this hot air (or anti-ice air) is routed from a compressor's inter-stage or discharge bleed. The inlet guide vanes typically then release the air into the compressor flowpath/core flow (via one or more outlet openings, often via many holes in the IGV surface). While this arrangement is currently used and successful for preventing ice, it has certain drawbacks. For example, adding hot air to the compressor's flowpath may cause temperature distortion which leads to loss of stability margin. It may also increase certain turbine temperatures which reduces turbine life. Overall engine performance may also suffer. The embodiments discussed in this description provide improved structures and methods that address these drawbacks.

Figure 1:
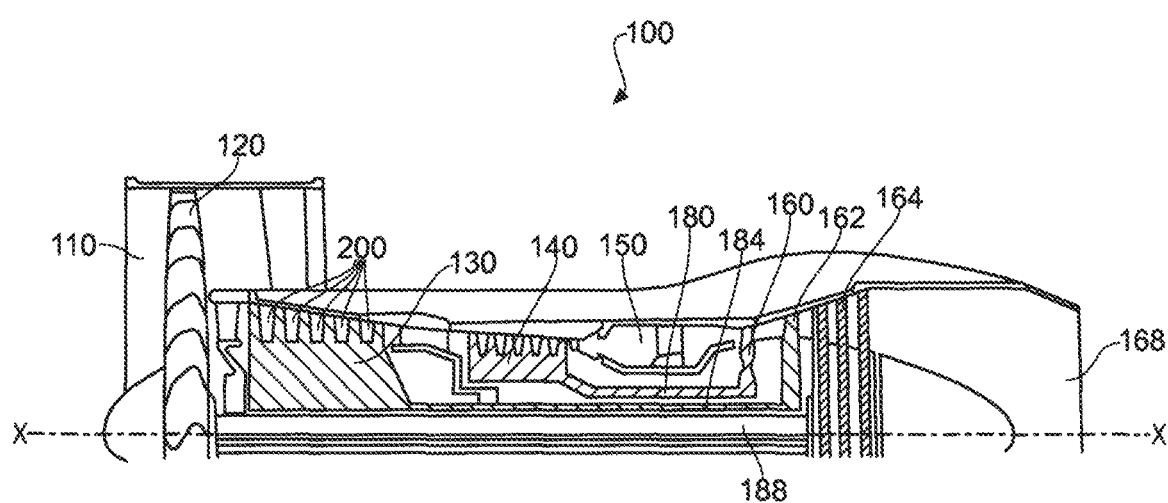
FIG. 1 is a partial section view of a gas turbine engine, particularly for use in aircraft applications.

FIG. 1 shows a schematic arrangement of a gas turbine engine for a typical aerospace application. The gas turbine engine 100 comprises in flow series an intake 110, a fan 120, an intermediate pressure compressor 130, a high pressure compressor 140, a combustion chamber 150, a high pressure turbine 160, an intermediate pressure turbine 162, a low pressure turbine 164 and an exhaust 168. The high pressure turbine 160 is arranged to drive the high pressure compressor 140 via a first shaft 180. The intermediate pressure turbine 162 is arranged to drive the intermediate pressure compressor 130 via a second shaft 184 and the low pressure turbine 164 is arranged to drive the fan 120 via a third shaft 188. In operation air flows into the intake 110 and is compressed by the fan 120. A first portion of the air flows through, and is compressed by, the intermediate pressure compressor 130 and the high pressure compressor 140 and is supplied to the combustion chamber 150. Fuel is injected into the combustion chamber 150 and is burned in the air to produce hot exhaust gases which flow through, and drive, the high pressure turbine 160, the intermediate pressure turbine 162 and the low pressure turbine 164. The hot exhaust gases leave the low pressure turbine 164 and flow through the exhaust 168 to provide propulsive thrust. A second portion of the air bypasses the main engine to provide propulsive thrust.

Typically, the intermediate pressure compressor 130 will include multiple stages of airflow control in the form of variable inlet guide vanes 200 for the first stage together with variable stator vanes 200 for the succeeding stages. Other configurations of the intermediate pressure compressor 130 may include a single stage of inlet guide vanes 200 without the succeeding stages of variable stator vanes 200. In this way, as the compressor speed is reduced from its design value these static vanes 200 are progressively closed in order to maintain an acceptable air angle value onto the following rotor blades.

Figure 2:
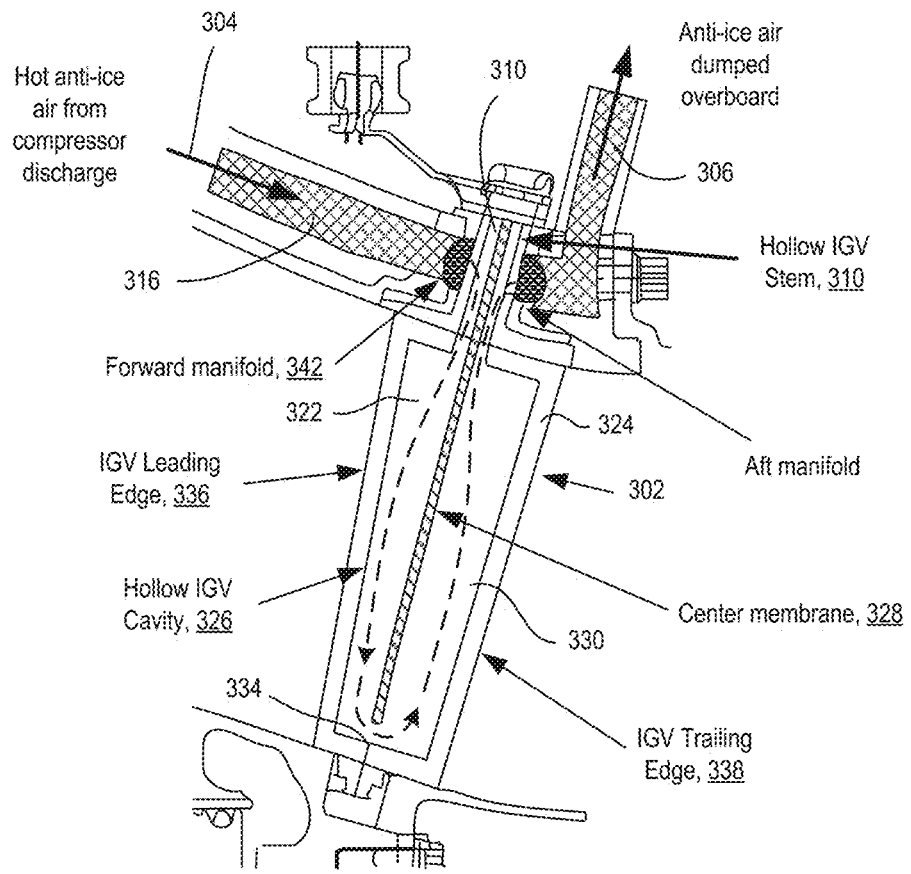
FIG. 2 is a side section view of a portion of an anti-ice system including a guide vane in accordance with certain aspects of the present disclosure.
Figure 3:
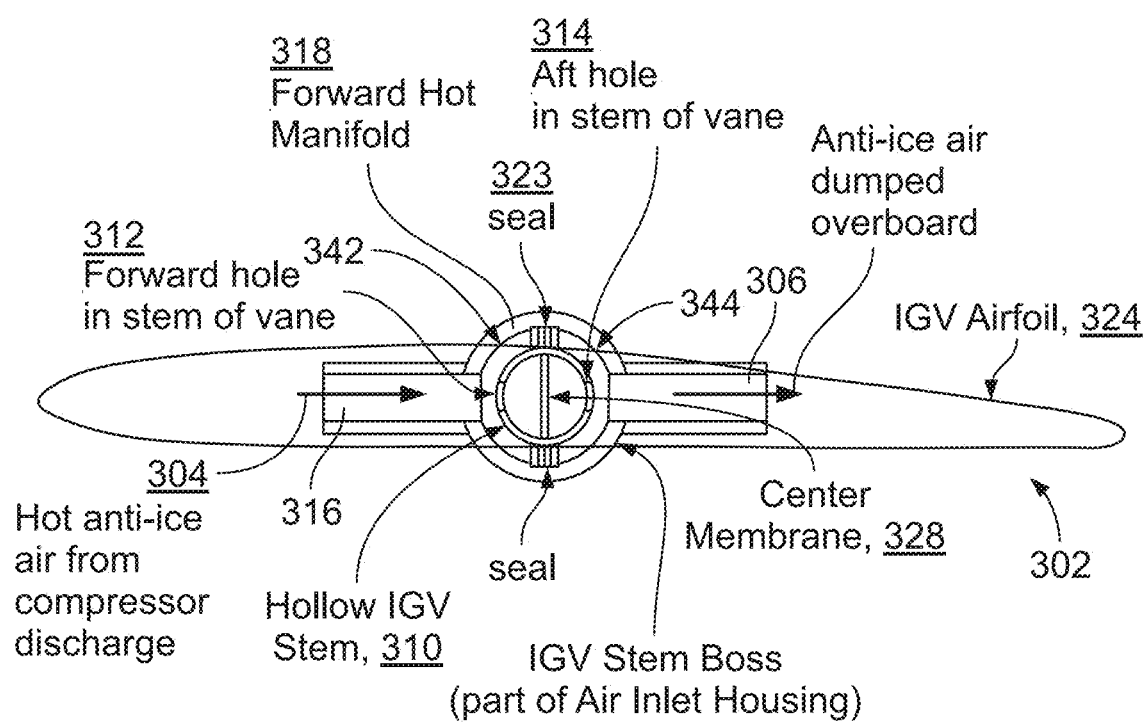
FIG. 3 is a top section view of a portion of the anti-ice system including a guide vane of FIG. 2.
Figure 4:
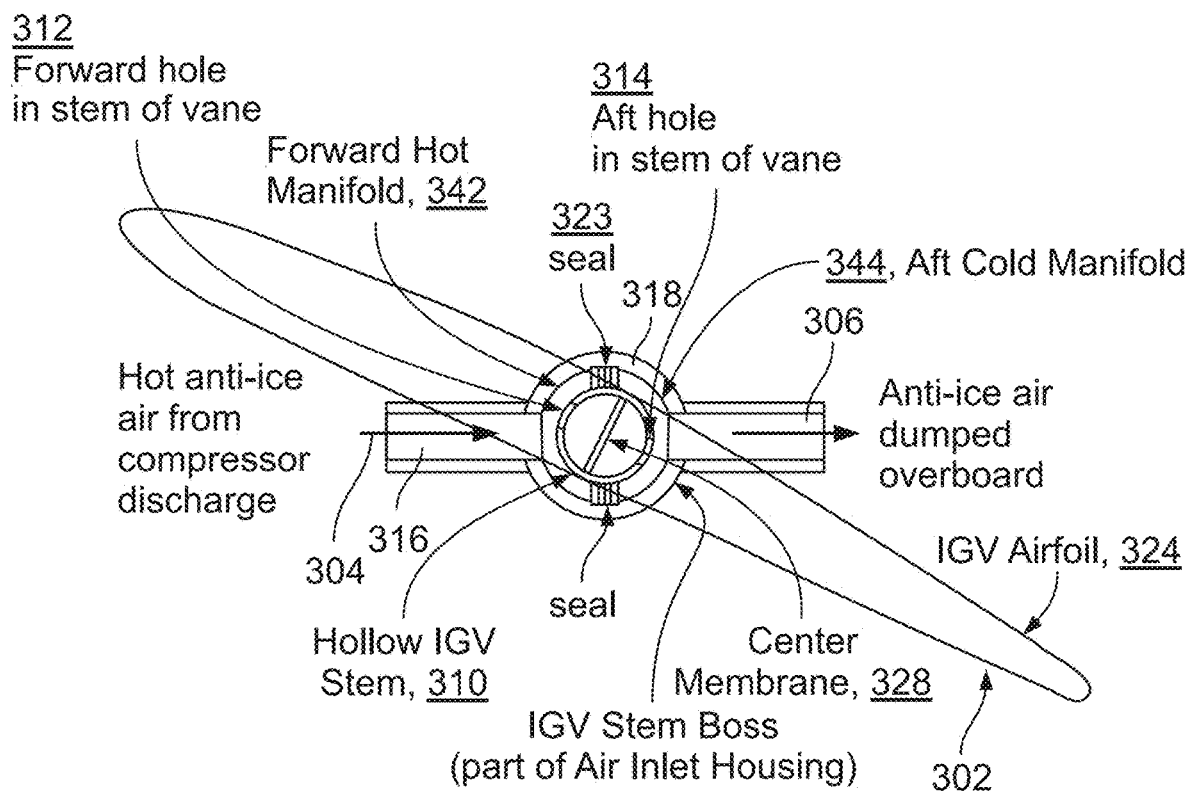
FIG. 4 is a section view of a portion of the anti-ice system including a guide vane of FIG. 2, where the guide vane is rotated relative to the orientation in FIG. 3.

FIGS. 2-4 show an example of a compressor 300 having an anti-ice system. An inlet guide vane 302 of the compressor 300 is arranged to receive hot air, or anti-ice air 304. The inlet guide vane 302 may receive hot air (e.g., routed from a location downstream within the compressor's flowpath and/or downstream of the compressor's discharge) to prevent ice buildup. Once circulated through the inlet guide vane 302 (as discussed in more detail below), the anti-ice air 304 may flow through an outlet channel 306 where it is ultimately dumped overboard via an outlet port 308. Advantageously, dumping the air overboard from the engine rather than back into the engine flowpath prevents the hot air from affecting compressor performance, prevents or substantially reduces temperature distortion, and may generally increase the engine's life via overall reduced temperatures.

As shown in FIGS. 2-4, the anti-ice air 304 is circulated through a flowpath within the inlet guide vane 302, where the inlet guide vane 302 has a stem 310 that includes an IGV inlet 312 and an IGV outlet 314. The anti-ice air reaches the IGV inlet 312 via an inlet channel 316, which may be formed integrally within other components and/or plumbed via tubing. The inlet channel 316 may receive hot air routed from a location downstream within the compressor's flowpath and/or downstream of the compressor's discharge.

The IGV inlet 312 may communicate with the inlet channel 316 at a stem manifold 318 located at a terminus of the inlet channel 316. The stem manifold 318 may be a generally cylindrical cavity and may receive a stem 310 of the inlet guide vane 302. The stem manifold 318 may have a manifold inlet (i.e., at a junction with the inlet channel 316) and also a manifold outlet (i.e., at a junction with the outlet channel 306). In the depicted embodiment, the manifold 318 has an inner diameter that is larger than an outer diameter of the stem 310, which allows the stem 310 to rotate within the manifold 318 while maintaining fluid communication with the inlet channel 316 and the outlet channel 306 (e.g., to accommodate adjustability of the inlet guide vane 302). To partition the manifold 318 between an inlet portion and an outlet portion (and also ensure the anti-ice air cannot bypass the inlet guide vane 302 by direct flow through the manifold), one or more seals 323 may be included, where the seals 323 generally contact the inner diameter of the manifold 318 and the outer diameter of the stem 310.

The stem 310 of the inlet guide vane 302 may be fixed to, and extend from, a main body 324 (or "airfoil") of the inlet guide vane 302. In the depicted embodiment, the stem 310 extends radially outward from the main body 324. As mentioned above, the stem 310 may extend into the manifold 318, and it may function to receive the anti-ice air 304 from the inlet channel 316 (via the IGV inlet 312 of the stem 310) and then discharge the anti-ice air 304 to the outlet channel 306 (via the IGV outlet 314 of the stem 310). The stem 310 may also function to secure the inlet guide vane 302 in place.

The stem 310, which may be hollow, may allow airflow to a corresponding hollow portion of the main body 324 of the inlet guide vane 302. Collectively, the hollow portion(s) of the inlet guide vane 302 that receive airflow are referred to as the anti-ice cavity 326.

The anti-ice cavity 326 may include a directed airflow path such that the anti-ice air 304 is directed along a particular route from the IGV inlet 312 to the IGV outlet 314. As shown, a center barrier 328 may generally distinguish the anti-ice cavity 326 between an inlet side 322 and an outlet side 330. The center barrier 328 may extend through the stem 310 and a portion of the main body 324, and it may terminate within the main body 324 (and/or have an opening within the main body 324) to allow airflow between the two sides. E.g, as shown in FIG. 2, a transition opening 334 is located at the radial-inner portion of the inlet guide vane 302 to allow the anti-ice air to flow from the inlet side 322 to the outlet side 330. This ensures that the entirety or majority of the inlet guide vane's airfoil is heated via the anti-ice air 304 flowing therein.

In the depicted embodiment, the inlet side 322 is located adjacent to a leading edge 336 and the outlet side 330 is located adjacent to a trailing edge 338. This may be desirable where a significant temperature loss is experienced by the anti-ice air as it flows through the inlet guide vane 302. However, this is not a required feature, and the opposite orientation may also be used.

FIGS. 3-4 depict a feature provided by the stem 310 and the manifold 318 that accounts for adjustability of the inlet guide vane 302. As shown in FIG. 3 (where the main body 324 is in a first position), the IGV inlet 312 is within the inlet portion 342 of the manifold 318 and similarly the IGV outlet 314 is within the outlet portion 344 of the manifold 318. In FIG. 4, the stem 310 has rotated relative to its position in FIG. 3 (to allow for adjustability of the main body 324). However, due to the shape and size of the manifold 318 (e.g., cylindrical surrounding the stem, and larger than the O.D. of the stem) and the position of the seals 323, the IGV inlet 312 remains within the inlet portion 342 of the manifold 318 and the IGV outlet 314 remains within the outlet portion 344 of the manifold 318. Up to 180 degrees of rotation of the stem 310 can be handled in this arrangement.

Figure 5:
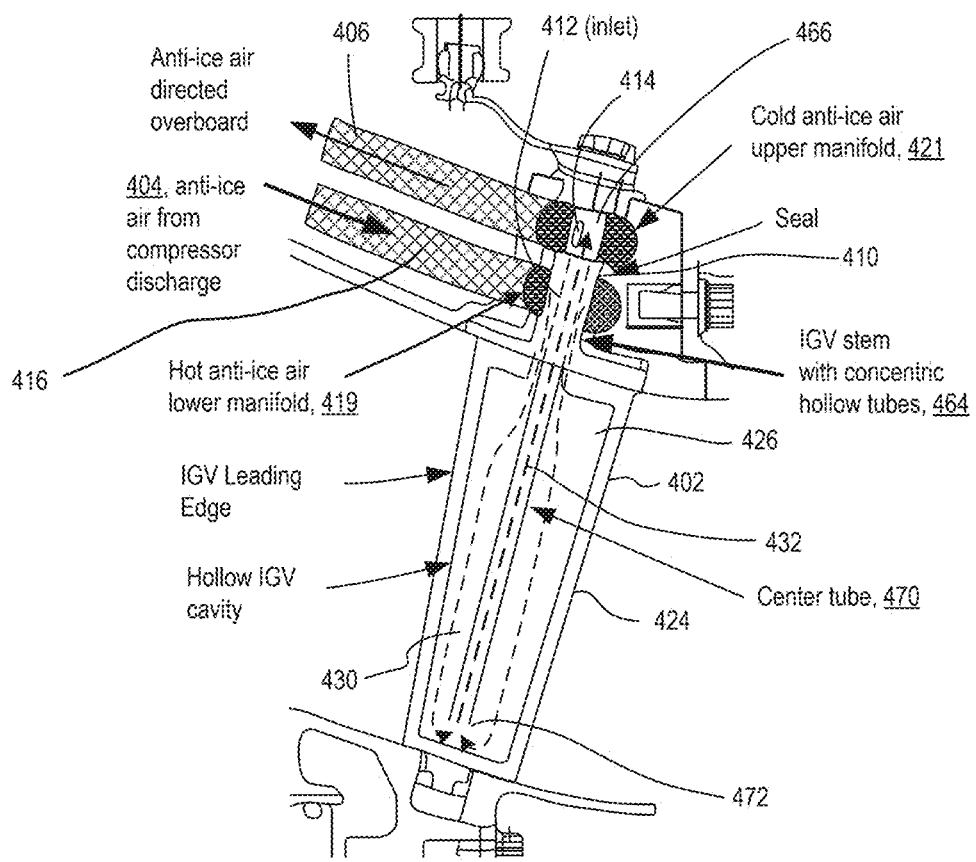
FIG. 5 is a side section view of a portion of another embodiment of an anti-ice system including a guide vane in accordance with certain aspects of the present disclosure.
Figure 6:
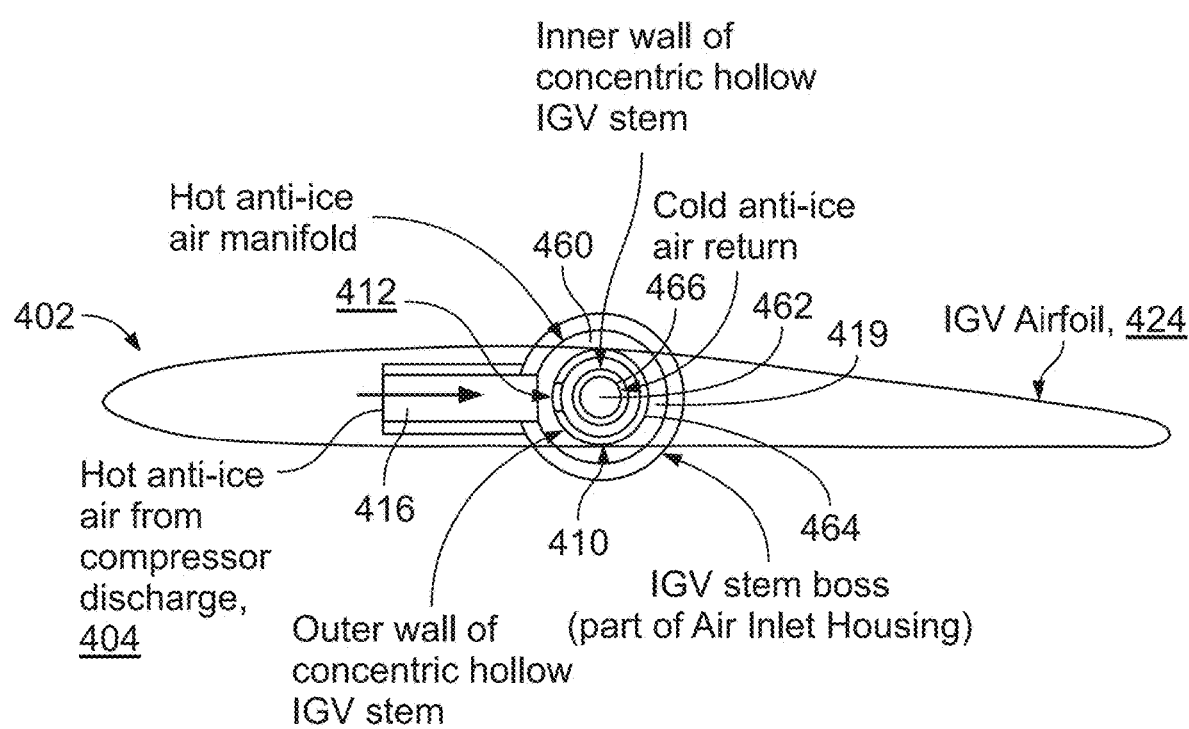
FIG. 6 is a top section view of the embodiment of an anti-ice system including a guide vane of FIG. 5.

FIGS. 5-6 show another embodiment of an anti-ice system, where up to 360 degrees of IGV rotation may be accommodated. As shown, an inlet channel 416 of the device leads to an inlet manifold 419, where the inlet manifold 419 is distinct from an outlet manifold 421. The inlet manifold 419 is associated with, and fluidly communicated with, an IGV inlet 412 located on a stem 410 of an inlet guide vane 402. The stem 410 may have multiple concentric cavities: an outer cavity 460 and an inner cavity 462. In the depicted embodiment, the outer cavity 460 is included as part of an inlet portion of the anti-ice cavity 426, and the inner cavity 462 may be included as part of an outlet portion of the anti-ice cavity 426. As such, the outer cavity 460 may be accessible via the IGV inlet 412, and the inner cavity 462 may be accessible via an IGV outlet 414.

As shown in FIG. 5, the stem 410 may have multiple segments with different diameters (where the segments are positionally-fixed to each other). For example, a first segment 464, which may generally define the outer boundary of the outer cavity 460 within the stem 410 and may be located within the inlet manifold 419, may extend directly from a main body 424 of the inlet guide vane 402. A second segment 466, which may extend from the first segment 464 radially outward within the compressor, may generally define the outer boundary of the inner cavity 462 within the stem 410 and may be located within the outlet manifold 421.

In this embodiment, since the inlet manifold 419 and the outlet manifold 421 are distinct and may completely surround their respective stem portions, the stem 410 may rotate 360 degrees about the stem's longitudinal axis without preventing airflow. Advantageously, this embodiment therefore provides enhanced IGV adjustability.

To direct airflow, an anti-ice cavity 426 within the main body 424 of the inlet guide vane 402 may generally have an inlet portion 430 (or outer portion) and an outlet portion 432 (or inner portion). This structure may be formed via including a center tube 470 within a generally hollow cavity of the main body 424, where the center tube 470 leads to the outlet inner cavity 460 of the stem 410, and where the outer portion of the anti-ice cavity 426 is directly in communication with the IGV inlet 412. Herein, a tube may be considered a "barrier" given that it separates inlet and outlet portions of an anti-ice cavity. As such, anti-ice air 404 flowing during normal operation will first flow from out-to-in through the outer portion of the anti-ice cavity until it reaches a terminus 472 of the center tube 470. The anti-ice air 404 will then flow in-to-out (or upward from the perspective of FIG. 4) through the center tube 470 to the IGV outlet 414.

Notably, the outlet channel 406 and the inlet channel 416 shown in FIG. 4 are coextensive and parallel, but this is not required. The outlet channel 406 may extend the opposite direction, as it does in the prior embodiment. As in the embodiment discussed above, the outlet channel 406 may flow towards an outlet port that ultimately dumps the anti-ice air overboard.

Figure 7:
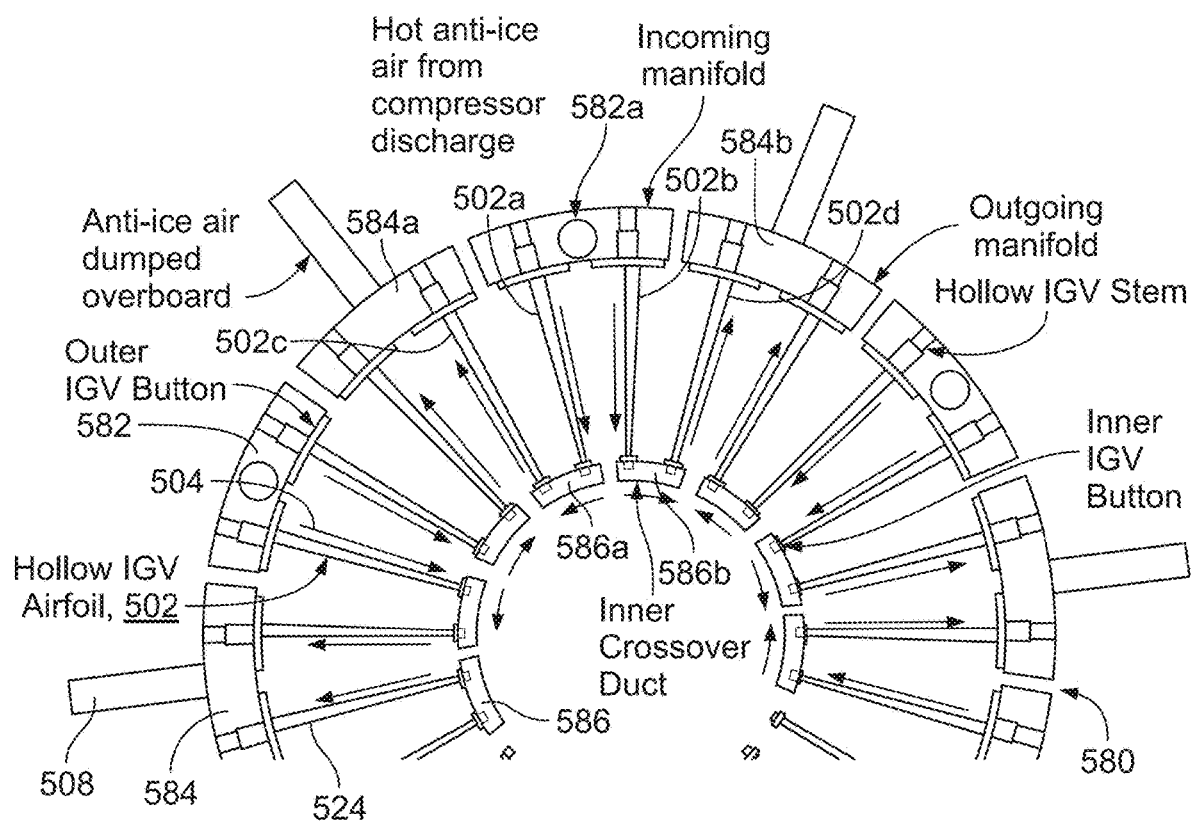
FIG. 7 is a front section view of another embodiment of an anti-ice system for a gas turbine engine, where a manifold assembly is included in accordance with certain aspects of the present disclosure.

FIG. 7 shows another embodiment of an anti-ice system. In this embodiment, anti-ice air 504 flows from a compressor discharge through tubes (much like the embodiments discussed above), and then into a 360 degree manifold arrangement 580. The manifold arrangement 580 may be integrally cast into an air inlet housing, for example, which may generally surround a plurality of inlet guide vanes 502.

The manifold arrangement 580 may be generally divided into manifolds of two types: a set of inlet manifolds 582 and a set of outlet manifolds 584. As shown, the inlet manifolds 582 may alternate with the outlet manifolds 584 along the perimeter of the manifold arrangement 580. Each of the inlet manifolds 582 may receive the anti-ice air from a location downstream within the compressor, and each of the outlet manifolds 584 may lead to an outlet port 508 for dumping the anti-ice air 504 overboard.

A unique aspect of this embodiment is the sequence of airflow of the anti-ice air 504 as it flows from an inlet manifold 582, through one or more inlet guide vanes 502, and then out via the outlet manifold 584. In particular, the anti-ice air 504 may arrive at a first inlet guide vane 502a via a first inlet manifold 582a. The first inlet manifold may also be associated with, and provide hot air to, a second inlet guide vane 502b. This is advantageous as associating each manifold with two inlet guide vanes (instead of one) may decrease the complexity of the system and the number of components needed.

The first inlet guide vane 502a (as well as the other inlet guide vanes) may include a main body 524 that is hollow, but without particular partitions (which may be distinct relative to the embodiments above). As such, air flowing through the first inlet guide vane 502a may flow radially-inwardly in a generally-linear motion to an inner crossover duct 586. The first inner crossover duct 586a may be located at the inner terminus of the first inlet guide vane 502a. Like each inlet and outlet duct, the inner crossover duct 586 may fluidly communicate with two inlet guide vanes. The first inner crossover duct 586a, for example, may be a generally hollow body that allows flow from the first inlet guide vane 502a to a third inlet guide vane 502c. Similarly, a second inner crossover duct 586b may allow flow of the anti-ice air from the second inlet guide vane 502b to a fourth inlet guide vane 502d.

Once air enters the third inlet guide vane 502c and the fourth inlet guide vane 502d, the anti-ice air flows radially outward towards, and into, respective outlet manifolds 584 (particularly the first outlet manifold 584a and the second outlet manifold 584b). Uniquely, anti-ice air entering an inlet manifold is ultimately split and flows into two different outlet manifolds, and each outlet manifold receives anti-ice air originating at two different inlet manifolds. As a result of this embodiment, two consecutive inlet guide vanes 502 with inward airflow alternate with two consecutive inlet guide vanes 502 with outward air flow around the perimeter of the system.

Figure 8:
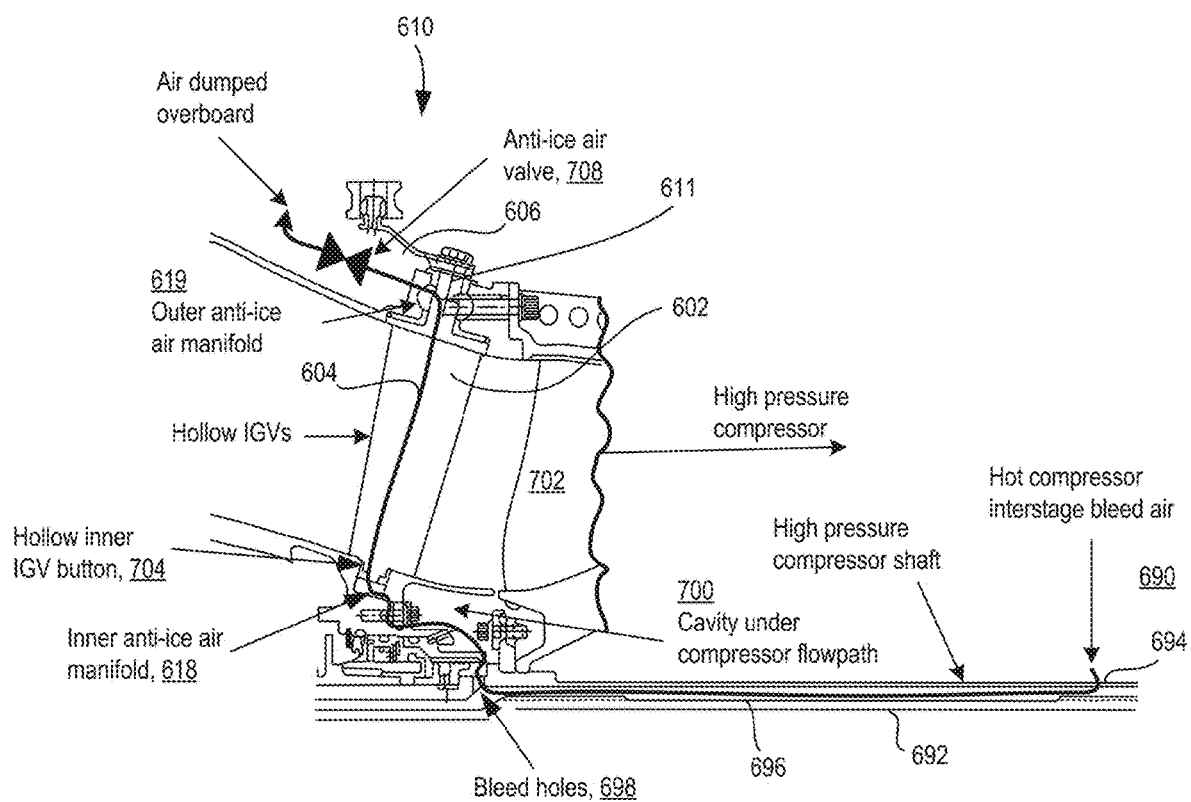
FIG. 8 is a side section view of a portion of a gas turbine engine having another embodiment of anti-ice system in accordance with certain aspects of the present disclosure.

FIG. 8 shows another embodiment of an anti-ice system 610. In this embodiment, the anti-ice air 604 is bled off from within a hub 690 of the compressor 600. The anti-ice air 604 is directed through holes or inlet openings 694 in a high pressure compressor shaft 692 and then flows through an elongated cavity 696 of the compressor shaft 692. The anti-ice air 604 then flows out through outlet openings 698 in the shaft and into a cavity 700 under (or radially inside) the compressor's main flowpath 702.

The anti-ice air 604 then enters into an inner manifold 618, which leads into each of the inlet guide vanes 602 via hollow inner stems 704 (which extend from respective main bodies 606 of the inlet guide vanes 602). The anti-ice air 604 then travels radially outward through hollow cavities of the inlet guide vanes 602, providing heating for prevention of ice, before being collected in an outer manifold 619 via an outer stem 611 of the inlet guide vane 602. Ultimately, the anti-ice air flows outward via an outlet channel 606 until being dumped overboard. A unique aspect of this embodiment is that the inlet guide vanes 602 receive airflow in an "in-to-out" flow path, which is advantageous since external piping and/or cast inlet channeling are not required to direct air at the compressor's discharge to the inlet guide vanes 602.

As shown in this embodiment, a valve 708 may regulate the flow of anti-ice air 604, turning it on and off and/or regulating the flow rate as is needed or desired. The valve in this embodiment is located in the outlet channel 606, but it may be located in other suitable locations. Further, a similar valve may be included in any other embodiment described herein, particularly either within an inlet channel or outlet channel. Other valve locations are also contemplated.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect includes a gas turbine engine that includes: an inlet guide vane; an inlet channel extending from a location downstream of the inlet guide vane to a stem manifold; and an outlet channel extending to an outlet port, the outlet port configured to dump anti-ice air overboard, wherein the inlet guide vane includes an anti-ice cavity in fluid communication with the inlet channel and the outlet channel such that anti-ice air, flowing from a downstream location within a core flow of the gas turbine, flows from the inlet channel, through the inlet guide vane, and to the outlet channel.

A second aspect includes the first aspect, and further includes wherein the inlet guide vane includes a stem, the stem having an inlet for receiving the anti-ice air from the inlet channel and an outlet for discharging the anti-ice air to the outlet channel.

A third aspect includes the second aspect, and further includes wherein the stem extends from an airfoil of the inlet guide vane.

A fourth aspect includes any of the second or third aspects, and further includes wherein the stem is located in a manifold, the manifold being located at a terminus of the inlet channel.

A fifth aspect includes the fourth aspect, and further includes wherein at least one seal is located between the stem and an inner diameter surface of the manifold.

A sixth aspect includes any of the second through fifth aspects, and further includes wherein the stem includes an outer cavity and an inner cavity that is concentric with the outer cavity, wherein one of the inner cavity and the outer cavity receives anti-ice air from the inlet channel, and wherein the other of the inner cavity and the outer cavity discharges the anti-ice air to the outlet channel.

A seventh aspect includes the sixth aspect, and further includes wherein the outer cavity and the inner cavity are located in first stem segment, wherein the inner cavity is located in a second stem segment, and wherein the first stem segment terminates adjacent to the second stem segment.

An eighth aspect includes any of the first through seventh aspects, and further includes wherein a barrier is located in the anti-ice cavity of the inlet guide vane such that the anti-ice cavity is separated between an inlet side and an outlet side.

A ninth aspect includes any of the first through eighth aspects, and further includes wherein a tube is located within the anti-ice cavity, the tube separating an inlet portion of the anti-ice cavity and an outlet portion of the anti-ice cavity.

A tenth aspect includes any of the first through ninth aspects, and further includes wherein the inlet guide vane is rotatable without ceasing fluid communication between the inlet channel and the outlet channel.

An eleventh aspect includes an inlet guide vane for a gas turbine engine, comprising: a main body at least partially forming an airfoil; a stem extending from the main body, wherein the stem includes an inlet configured for receiving an anti-ice air and an outlet configured for discharging an anti-ice air from the inlet guide vane; an anti-ice cavity at least partially within the main body; and a barrier separating an inlet portion of the anti-ice cavity and an outlet-portion of the anti-ice cavity.

A twelfth aspect includes the eleventh aspect, and further includes wherein the stem extends radially outward from the main body.

A thirteenth aspect includes any of the eleventh or twelfth aspects, and further includes wherein the barrier is configured to direct the anti-ice air through a predetermined flow path within the anti-ice cavity.

A fourteenth aspect includes any of the eleventh through thirteenth aspects, and further includes wherein the barrier includes a tube.

A fifteenth aspect includes any of the eleventh through fourteenth aspects, and further includes wherein the barrier separates an inlet side of the anti-ice cavity from an outlet side of the anti-ice cavity, and wherein the barrier forms an opening providing fluid communication between the inlet side and the outlet side.

A sixteenth aspect includes any of the eleventh through fifteenth aspects, and further includes wherein the stem includes an outer cavity and an inner cavity that are concentric, wherein one of the inner cavity and the outer cavity includes the inlet, and the other of the inner cavity and the outer cavity includes the outlet.

A seventeenth aspect includes any of the eleventh through sixteenth aspects, and further includes wherein the stem is configured for receipt within a manifold that receives the anti-ice air.

An eighteenth aspect includes the seventeenth aspect, and further includes wherein when received by the manifold, a seal is located between an inner diameter surface of the manifold and the stem.

A nineteenth aspect includes an anti-ice system for a gas turbine engine, comprising: an inlet guide vane; an inlet channel extending from a location downstream of the inlet guide vane to a stem manifold; and an outlet channel extending to an outlet port, the outlet port configured to dump anti-ice air overboard, wherein the inlet guide vane includes an anti-ice cavity in fluid communication with the inlet channel and the outlet channel such that anti-ice air, flowing from a downstream location within a core flow of the gas turbine, flows from the inlet channel, through the inlet guide vane, and to the outlet channel.

A twentieth aspect includes the nineteenth aspect, and further includes wherein the inlet guide vane includes a stem, the stem having an inlet for receiving the anti-ice air from the inlet channel and an outlet for discharging the anti-ice air to the outlet channel.

We claim:

1. A gas turbine engine, comprising:
    an inlet guide vane including a main body and a stem extending radially outward from the main body, the stem having an inlet for receiving anti-air ice and an outlet for discharging the anti-ice air, the stem being arranged in a stem manifold;
    an inlet channel extending from a location downstream of the inlet guide vane to the stem manifold, the inlet channel configured to direct the anti-ice air to the inlet of the stem; and
    an outlet channel extending to an outlet port and configured to receive the anti-ice air from the outlet of the stem, the outlet port configured to dump anti-ice air overboard,
    wherein the inlet guide vane includes an anti-ice cavity in fluid communication with the inlet channel and the outlet channel such that the anti-ice air, flowing from the location downstream within a core flow of the gas turbine engine, flows from the inlet channel, into the inlet of the stem, through the anti-ice cavity of the inlet guide vane, through the outlet of the stem, and to the outlet channel,
    wherein the stem is configured to rotate within the stem manifold while maintaining fluid communication with the inlet channel and the outlet channel.

2. The gas turbine engine of claim 1, wherein the stem extends from an airfoil of the inlet guide vane.

3. The gas turbine engine of claim 1, wherein the stem is located in the stem manifold, the stem manifold being located at a terminus of the inlet channel.

4. The gas turbine engine of claim 3, wherein at least one seal is located between the stem and an inner diameter surface of the stem manifold.

5. The gas turbine engine of claim 1, wherein the stem includes an outer cavity and an inner cavity that is concentric with the outer cavity, wherein one of the inner cavity and the outer cavity receives the anti-ice air from the inlet channel, and wherein the other of the inner cavity and the outer cavity discharges the anti-ice air to the outlet channel.

6. The gas turbine engine of claim 5, wherein the outer cavity is located in a first stem segment, wherein the inner cavity is located in a second stem segment, and wherein the first stem segment terminates adjacent to the second stem segment, the second stem segment located radially outward of the first stem segment.

7. The gas turbine engine of claim 1, wherein a barrier is located in the anti-ice cavity of the inlet guide vane such that the anti-ice cavity is separated between an inlet side and an outlet side.

8. The gas turbine engine of claim 1, wherein a tube is located within the anti-ice cavity, the tube separating an inlet portion of the anti-ice cavity and an outlet portion of the anti-ice cavity, the inlet portion of the anti-ice cavity being formed adjacent a leading edge of the inlet guide vane and adjacent a trailing edge of the inlet guide vane opposite the leading edge.

9. The gas turbine engine of claim 1, wherein the inlet guide vane is rotatable 360 degrees without ceasing fluid communication between the inlet channel and the outlet channel.

10. An inlet guide vane for a gas turbine engine, comprising:
a main body at least partially forming an airfoil;
a stem extending radially outwardly from the main body, wherein the stem includes an inlet configured for receiving an anti-ice air and an outlet configured for discharging the anti-ice air from the inlet guide vane;
an anti-ice cavity at least partially within the main body; and
a barrier separating an inlet portion of the anti-ice cavity and an outlet portion of the anti-ice cavity, the barrier comprising a hollow tube in fluid communication with the outlet of the stem,
wherein the anti-ice air flows into the stem via the inlet, radially inwardly through the main body axially forward of the hollow tube and axially aft of the hollow tube, and then turns at a terminus of the hollow tube to flow radially outwardly within the hollow tube to the outlet of the stem.

11. The inlet guide vane of claim 10, wherein the stem includes an outer cavity and an inner cavity that are concentric, wherein one of the inner cavity and the outer cavity includes the inlet, and the other of the inner cavity and the outer cavity includes the outlet.

12. The inlet guide vane of claim 11, wherein the outer cavity of the stem includes the inlet and the inner cavity of the stem includes the outlet, and wherein the outer cavity directs the anti-ice air to the inlet portion of the anti-ice cavity and the inner cavity receives the anti-ice air from the outlet portion of the anti-ice cavity.

13. The inlet guide vane of claim 11, wherein the outer cavity is located in a first stem segment, wherein the inner cavity is located in a second stem segment, and wherein the second stem segment is located radially outward of the first stem segment.

14. The inlet guide vane of claim 10, wherein the hollow tube is circumferentially entirely surrounded by the inlet portion of the anti-ice cavity.

15. The inlet guide vane of claim 10, wherein the outlet of the stem is located radially outward of the inlet of the stem.

16. The inlet guide vane of claim 10, wherein the inlet of the stem is in fluid communication with an inlet channel that direct the anti-ice air toward the inlet and the outlet of the stem is in fluid communication with an outlet channel that receives the anti-ice air from the outlet, and wherein the stem and the main body are configured to rotate while maintaining fluid communication with the inlet channel and the outlet channel.

17. The inlet guide vane of claim 10, wherein the stem is configured for receipt within a manifold that receives the anti-ice air.

18. An anti-ice system for a gas turbine engine, comprising:
an inlet guide vane including a body and a stem extending outwardly therefrom, the stem arranged in a stem manifold and including an outer cavity and an inner cavity coaxial with the outer cavity;
an inlet channel extending from a location downstream of the inlet guide vane to the stem manifold, the inlet channel in fluid communication with the outer cavity of the stem; and
an outlet channel extending to an outlet port and in fluid communication with the inner cavity of the stem, the outlet port configured to dump anti-ice air overboard,
wherein the inlet guide vane includes an anti-ice cavity in fluid communication with the inlet channel and the outlet channel such that anti-ice air, flowing from a downstream location within a core flow of the gas turbine engine, flows from the inlet channel, through the outer cavity, through the inlet guide vane, through the inner cavity, and to the outlet channel.

19. The anti-ice system for the gas turbine engine of claim 18, wherein the stem includes an inlet for receiving the anti-ice air from the inlet channel and an outlet for discharging the anti-ice air to the outlet channel.

* * * * *